United States Patent
Henry (10) Patent No.: US 7,575,276 B1
(45) Date of Patent: Aug. 18, 2009

(54) 360 DEGREE PIVOTAL VEHICLE CHILD SEAT AND ASSOCIATED METHOD

(76) Inventor: Collin Henry, 78-11 58th Ave., Apartment 1R, Elmhurst, NY (US) 11379

( * ) Notice: Subject to any disclaimer, the term of this patent is extended or adjusted under 35 U.S.C. 154(b) by 287 days.

(21) Appl. No.: 11/706,708

(22) Filed: Feb. 13, 2007

Related U.S. Application Data (60) Provisional application No. 60/772,129, filed on Feb. 13, 2006.

(51) Int. Cl.
*A47C 1/08* (2006.01)
*A47C 1/00* (2006.01)

(52) U.S. Cl. .............................. 297/256.12; 297/344.21; 297/344.22

(58) Field of Classification Search ............... 297/183.3, 297/256.12, 344.21, 344.22
See application file for complete search history.

(56) References Cited

U.S. PATENT DOCUMENTS

| | | | |
|---|---|---|---|
| 6,139,101 A | 10/2000 | Berringer | |
| 6,196,629 B1 * | 3/2001 | Onishi et al. | 297/256.12 |
| 6,520,579 B2 * | 2/2003 | Kassai et al. | 297/256.12 |
| 6,536,842 B2 * | 3/2003 | Bowers et al. | 297/344.22 |
| 6,619,742 B1 * | 9/2003 | Bellefleur | 297/344.21 |
| 6,631,958 B1 | 10/2003 | Herrmann | |
| 6,739,661 B1 | 5/2004 | Dukes | |
| 7,140,685 B2 * | 11/2006 | Gardner | 297/344.26 |

* cited by examiner

*Primary Examiner*—David Dunn
*Assistant Examiner*—Erika Garrett (57) ABSTRACT

A pivotal vehicle child seat and associated method includes a base member with a top surface and vertically upstanding walls formed therewith. The top surface is countersunk below a top edge of the walls, such that a recessed cavity is formed therein, and a seat member is vertically stacked on top of the base member and has a bottom ridge within the recessed cavity. A mechanism lifts and swivels the seat member above the base member and about a vertically registered fulcrum axis centrally defined within the recessed cavity. The mechanism is maintained at a locked position so the user is required to actively maintain an actuating force traversing the fulcrum axis so that the bottom ridge remains elevated above the recessed cavity during swiveling procedures.

6 Claims, 8 Drawing Sheets

360 DEGREE PIVOTAL VEHICLE CHILD SEAT AND ASSOCIATED METHOD

CROSS REFERENCE TO RELATED APPLICATIONS

This application claims the benefit of U.S. Provisional Application No. 60/772,129, filed Feb. 13, 2006, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to child safety seats and, more particularly, to a 360 degree pivotal vehicle child seat and associated method for enabling a caregiver to easily access a child in space-restricted vehicle zones.

2. Prior Art

Child or infant car seats are especially designed to carry an infant or toddler in a vehicle. Child car seats serve two primary purposes. First, the child car seat retrains and prevents injury to the child in the event of an accident. Secondly, the child car seat holds the child in a comfortable manner so that the child does not move about the car while it is being driven. Car seats are secured to a rear automobile seat by either a lap or lap/shoulder seat belt, or the LATCH system. Typically, infants that weigh up to 22 pounds are placed in a rear-facing position. Toddlers that weigh from between about 20 to 40 pounds are placed in a forward-facing position. A rear-facing position is employed for infants so as to better support their head and neck during transport and in a crash.

One prior art example shows an adjustable child car seat that includes a base with a pivot rod at one end and a level adjuster receptor with a plurality of adjust positions at an opposite end. A recliner is carried by the base at the pivot rod. The recliner provides a level adjuster that is selectively moveable into any one of the adjust positions. The recliner also provides a seat recline level adjuster receptor with a plurality of recline positions. A car seat is pivotally mounted to the recliner by a seat pin. A seat recline adjuster is slidably mounted to the car seat and is selectively moveable into one of the recline positions. Accordingly, the level adjuster allows positioning of the base to the angle of the supporting seat. Further adjustment is permitted by moving the seat with respect to the recliner. Unfortunately, this prior art examples does not allow the seat to be swiveled 360 degrees while attached to an existing car seat.

Another prior art example shows a child safety seat that pivots between a sitting and reclining position on a base secured by a vehicle safety belt. A pair of pivot arms extending from each side of the safety seat slides in a pair of grooves in each side of the base. The primary pivot arm moves in an essentially horizontal groove to maintain a low center of gravity. A secondary pivot arm stabilizes the safety seat and helps to maintain the safety seat back in close proximity with the vehicle seat back. A high pivot arm near the top of each side of the seat may be positioned in a mating opening or a slotted opening in each side of the base. A motor and reversible drive assembly, which may be remotely controlled, can be used to move the safety seat. Unfortunately, this prior art example also does not allow a user to swivel the seat 360 degrees while attached to an existing car seat. In addition, this prior art example does not allow a user to remove the seat section from the base platform for transport.

Accordingly, a need remains for a pivotal vehicle child seat and associated method. The present invention satisfies such a need by providing an apparatus that is convenient and easy to use, lightweight yet durable in design, and enables a caregiver to easily access a child in space-restricted vehicle zones. This cleverly designed child safety seat would provide parents and caregivers a simple and efficient means of keeping their infant safely restrained when traveling in a car. Utilizing the LATCH installation system, as well as the standard safety belt installation method, the apparatus can be installed in virtually any back seat, in a secure and stable manner. Consumers will also appreciate that by utilizing a three point harness, three point harness with shield, or five point harness tether system, the child remains safely restrained at all times. Safely, yet comfortably restricting the child's movements, the apparatus prevents the child from being jolted or thrown from the seat in the case of sudden stops or an automobile collisions. Eliminating the need to literally climb into the back seat of one's vehicle, or awkwardly bend and stretch simply in order to reach deep into the back seat, the apparatus enables consumers to load or retrieve the child, as well as attend to the child's basic needs, in a comfortable and simple manner. The present invention is simple to use, inexpensive, and designed for many years of repeated use.

BRIEF SUMMARY OF THE INVENTION

In view of the foregoing background, it is therefore an object of the present invention to provide an apparatus for a pivotal vehicle child seat and associated method. These and other objects, features, and advantages of the invention are provided by a portable vehicle child seat for enabling a caregiver to easily access a child in space-restricted vehicle zones.

The apparatus includes a base member that has a top surface and a plurality of vertically upstanding walls monolithically formed therewith. Such a top surface is conveniently countersunk below a top edge of the walls such that a recessed cavity is effectively formed within an inner perimeter of the walls. A seat member is vertically stacked on top of the base member and has a bottom ridge removably disposed within the recessed cavity.

The apparatus further includes a mechanism for lifting and swiveling the seat member above the base member and about a vertically registered fulcrum axis centrally defined within the recessed cavity such that the bottom ridge is advantageously elevated above the top edge of the walls to thereby effectively allow the seat member to freely rotate along a 360 degree path above the base member. The seat member lifting and swiveling mechanism is naturally maintained at a locked position such that the user is required to actively maintain an actuating force traversing the fulcrum axis so that the bottom ridge remains advantageously elevated above the recessed cavity during swiveling procedures.

The seat member lifting and rotating mechanism includes a plurality of notches conveniently formed within the inner perimeter of the walls and juxtaposed therealong, and a platform statically anchored to a bottom surface of the seat member and centrally abutted against the bottom ridge. Such a platform effectively protrudes downwardly from the bottom ridge and has a plurality of ribs radially flanging outwardly from an exterior perimeter of the platform such that the ribs are slidably intercalated within the notches when the seat member is positioned on the base member. A rectilinear shaft is directly connected to the top surface and the bottom surface of the seat section respectively. Such a shaft is advantageously aligned along the vertical axis wherein the vertical axis is centrally positioned within the walls and oriented perpendicular to the bottom surface. Such notches have open top surfaces thereby conveniently allowing the ribs to vertically disengage therefrom when the shaft is lifted to the elevated position.

The seat member lifting and swiveling mechanism further includes a cam member seated within the recessed cavity and monolithically abutted against a bottom most end of the shaft, and a rectilinear actuating arm horizontally spanning into the recessed cavity and confronting the cam member such that a distal end of the actuating arm directly contacts the cam member during operating conditions. Such a cam member is effectively displaced upwardly along a vertical and linear direction when the actuating arm is pressed inwardly towards a center of the recessed cavity to thereby conveniently lift the shaft along a vertical path and create an unencumbered horizontal plane between the walls of the base member and the bottom ridge of the seat member. The cam member is effectively lowered along a vertical and linear clockwise direction when the actuating arm is retracted away therefrom so that the shaft advantageously returns to a lowered rested position. The seat member is freely rotatable along the horizontal plane while the shaft is biased at an elevated position.

In operation, a method for lifting and swiveling an infant car seat along a 360 degree rotational path includes the steps of providing a base member that has a top surface and a plurality of vertically upstanding wall monolithically formed therewith, vertically stacking a seat member on top of the base member, the seat member has a bottom ridge removably disposed within the recessed cavity, and lifting and swiveling the seat member along a 360 degree path defined above the base member and about a vertically registered fulcrum axis centrally defined within the recessed cavity by elevating the bottom ridge above the top edge of the walls to thereby allow the seat member to freely rotate above the base member. The top surface is countersunk below a top edge of the walls such that a recessed cavity is formed within an inner perimeter of the walls. The seat member lifting and swiveling mechanism is naturally maintained at a locked position such that the user is required to actively maintain an actuating force traversing the fulcrum axis so that the bottom ridge remains elevated above the recessed cavity during swiveling procedures.

The method further includes the steps of seating a cam member within the recessed cavity by monolithically abutting the cam member against a bottom most end of the shaft, horizontally spanning a rectilinear actuating arm into the recessed cavity by confronting the actuating arm against the cam member such that a distal end of the actuating arm directly contacts the cam member during operating conditions, inwardly pressing the actuating arm into a center of the recessed cavity to thereby displace the cam member along a vertical and linear direction, lifting the shaft along a vertical path and creating an unencumbered horizontal plane between the walls of the base member and the bottom ridge of the seat member, and freely rotating the seat member along the horizontal plane while the shaft is biased at an elevated position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-8 by the reference numeral 10 and is intended to provide a pivotal vehicle child seat and associated method. It should be understood that the apparatus 10 may be used to provide a seat for many different types of individuals and should not be limited in use to providing a seat for only those types of individuals described herein.

Referring to FIGS. 1, 2, 3, 4, 5, 6, 7 and 8, the apparatus 10 includes a base member 20 that has a top surface 21 and a plurality of vertically upstanding walls 22 monolithically formed therewith. Such a top surface 21 is countersunk below a top edge 23 of the walls 22, which is essential such that a recessed cavity 24 is formed within an inner perimeter of the walls 22. A seat member 26 (herein described below) is vertically stacked on top of the base member 20 and has a bottom ridge 27 removably disposed within the cavity 24. Such a cavity 24 defines the boundaries of the area in which the seat member 26 can move.

Figure 1:
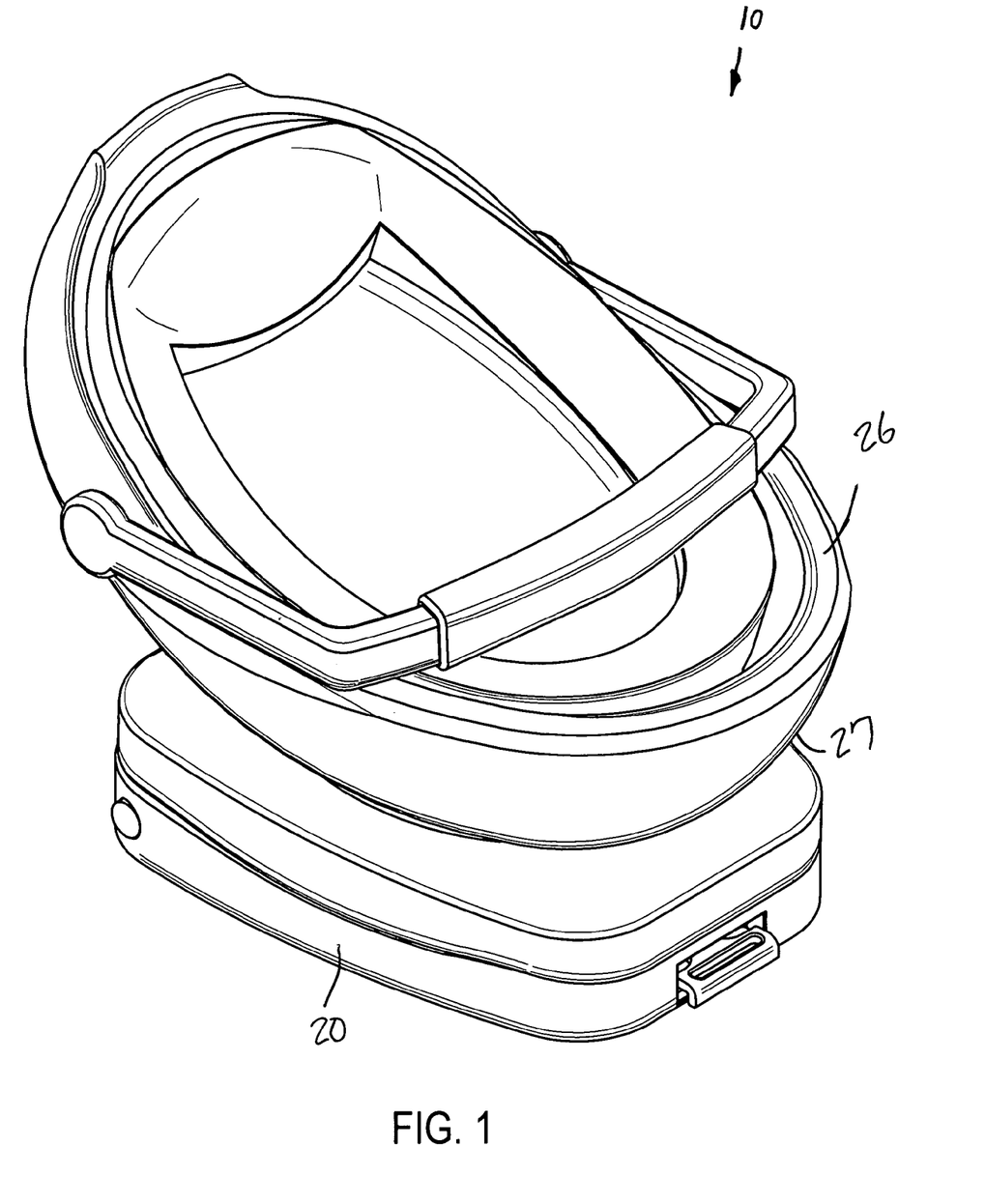
FIG. 1 is a perspective view of a pivotal vehicle child seat and associated method, in accordance with the present invention.
Figure 2:
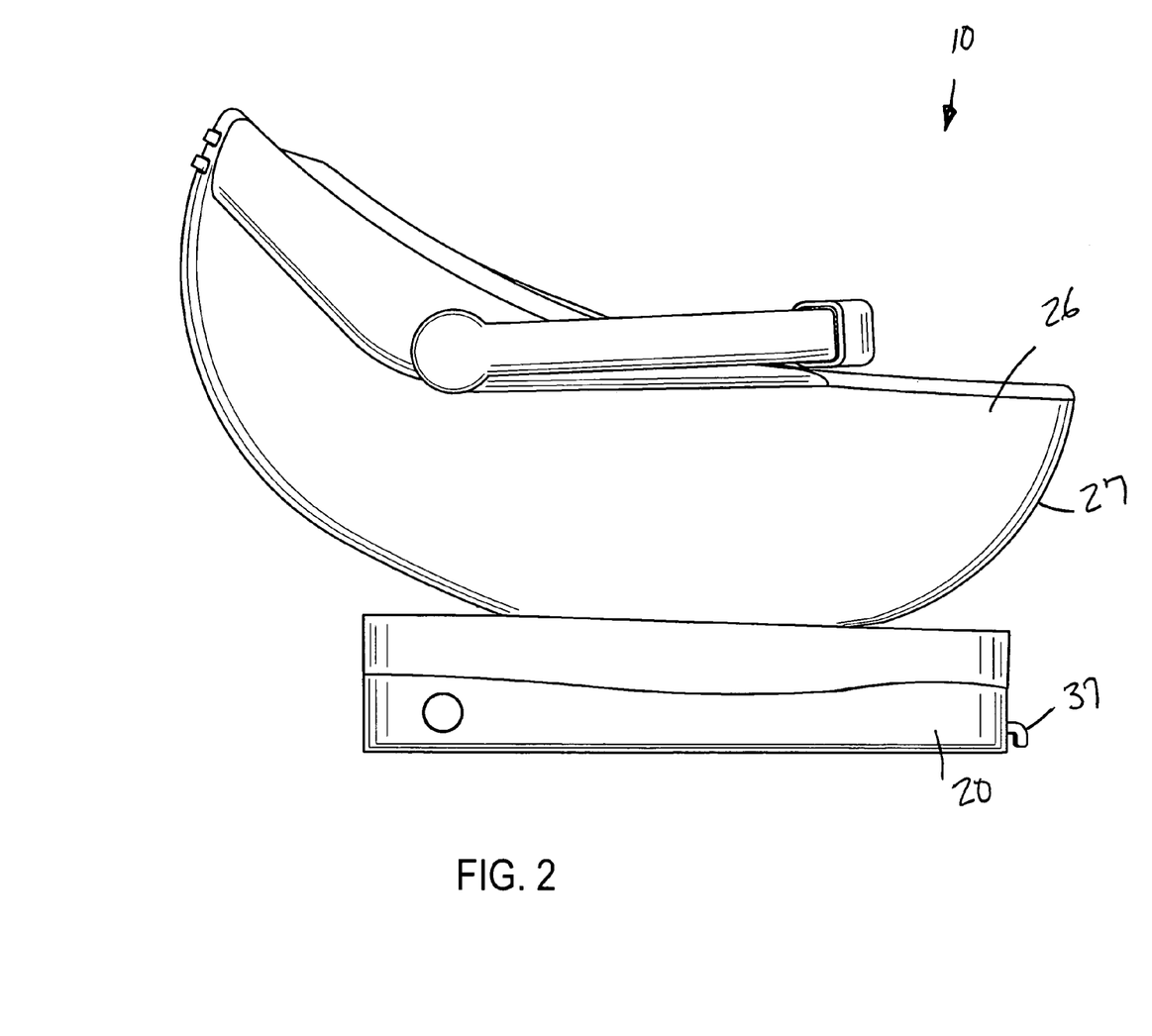
FIG. 2 is a is a side elevational view of the apparatus shown in FIG. 1.
Figure 3:
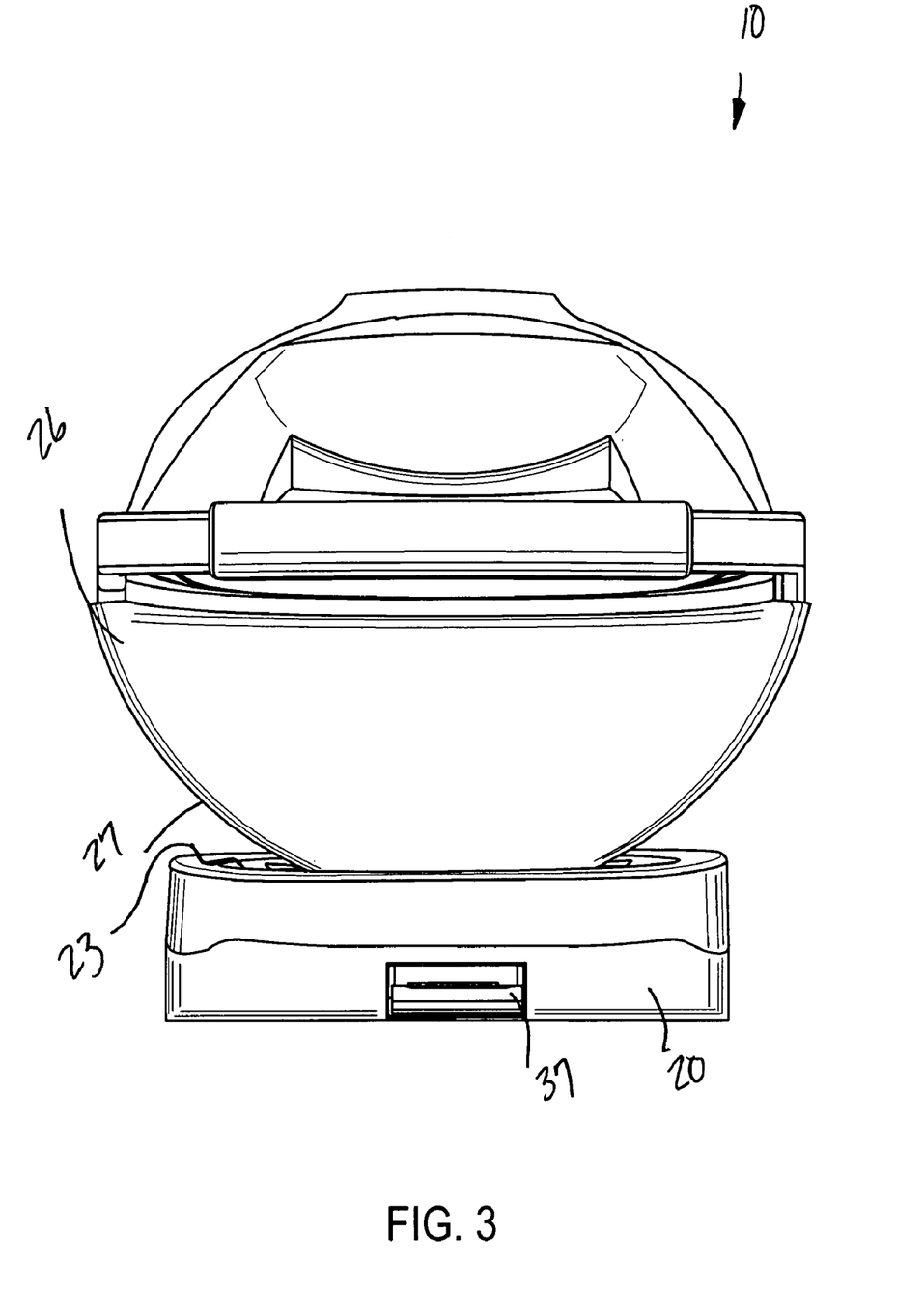
FIG. 3 is a front elevational view of the apparatus shown in FIG. 1.
Figure 4:
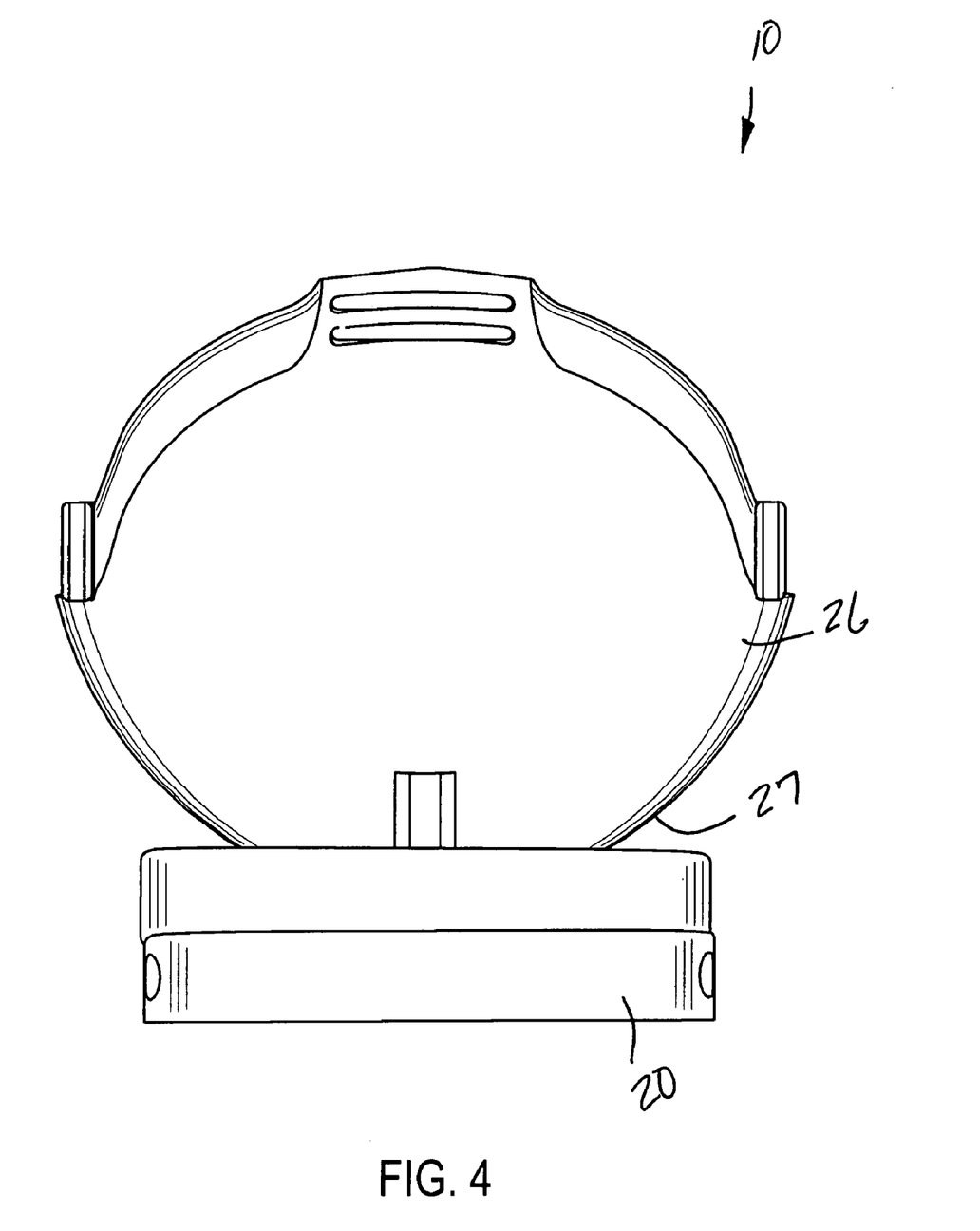
FIG. 4 is a rear elevational view of the apparatus shown in FIG. 1.
Figure 5:
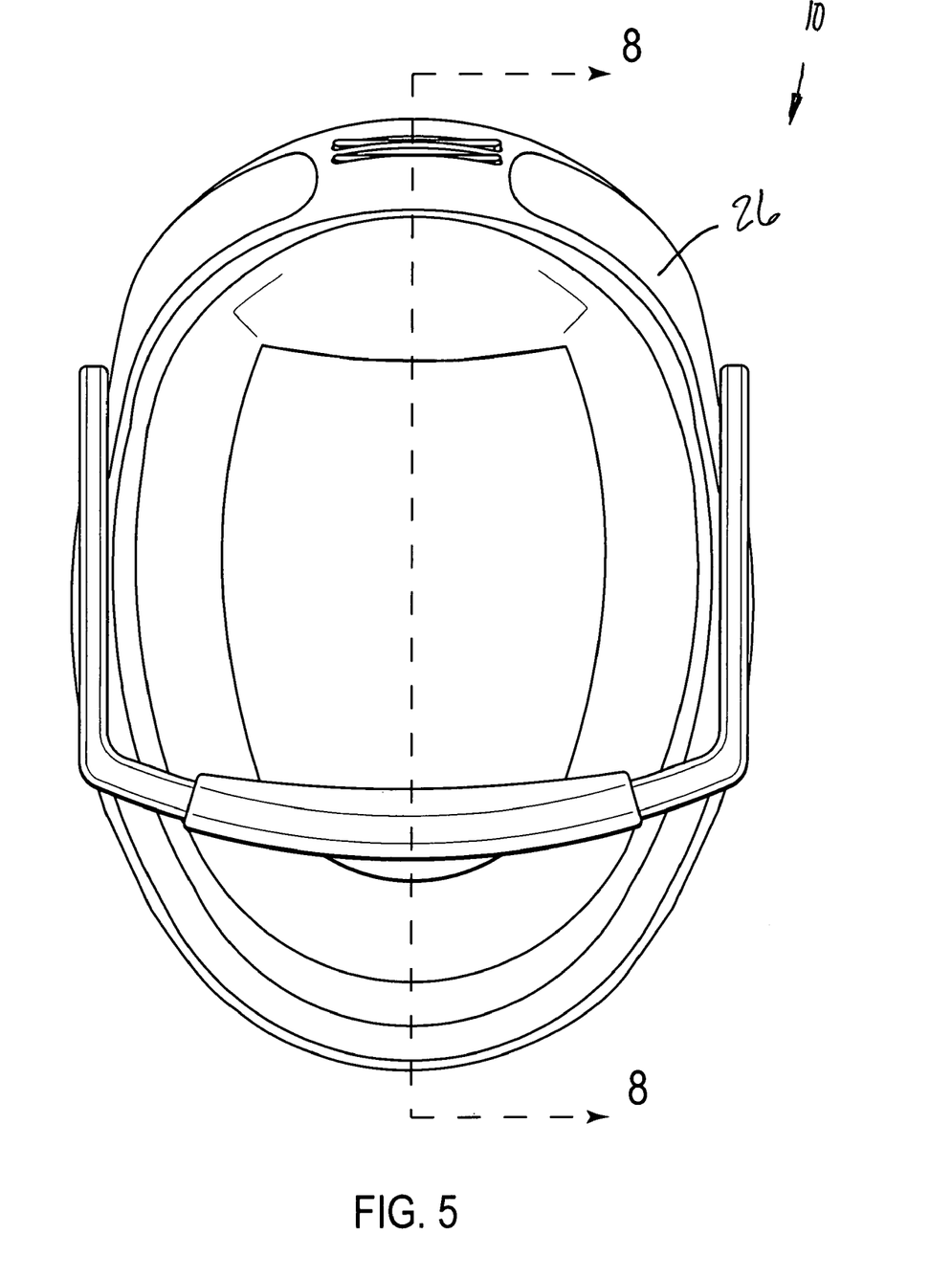
FIG. 5 is a top plan view of the apparatus shown in FIG. 1.
Figure 6:
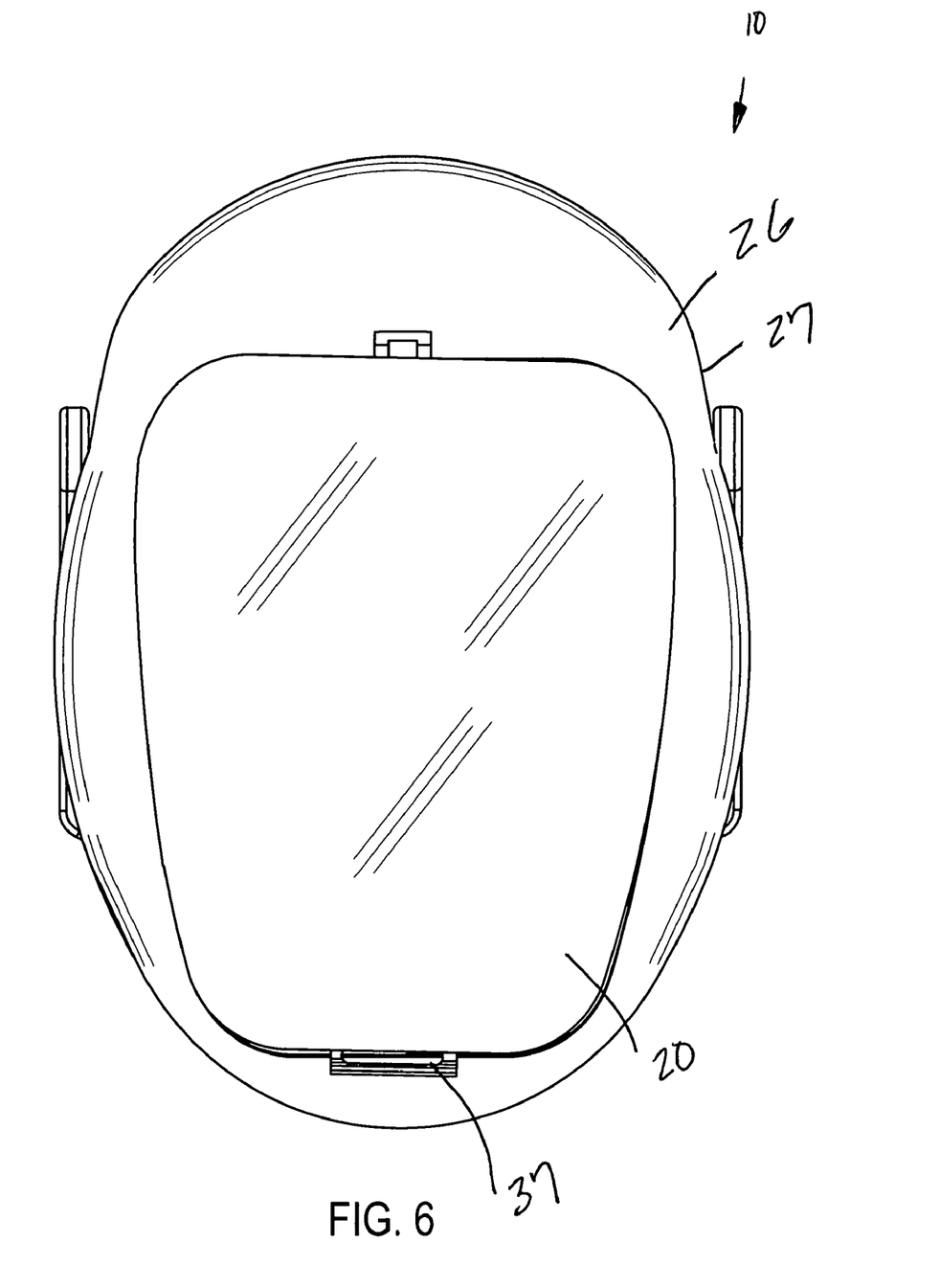
FIG. 6 is a bottom plan view of the apparatus shown in FIG. 1.
Figure 7:
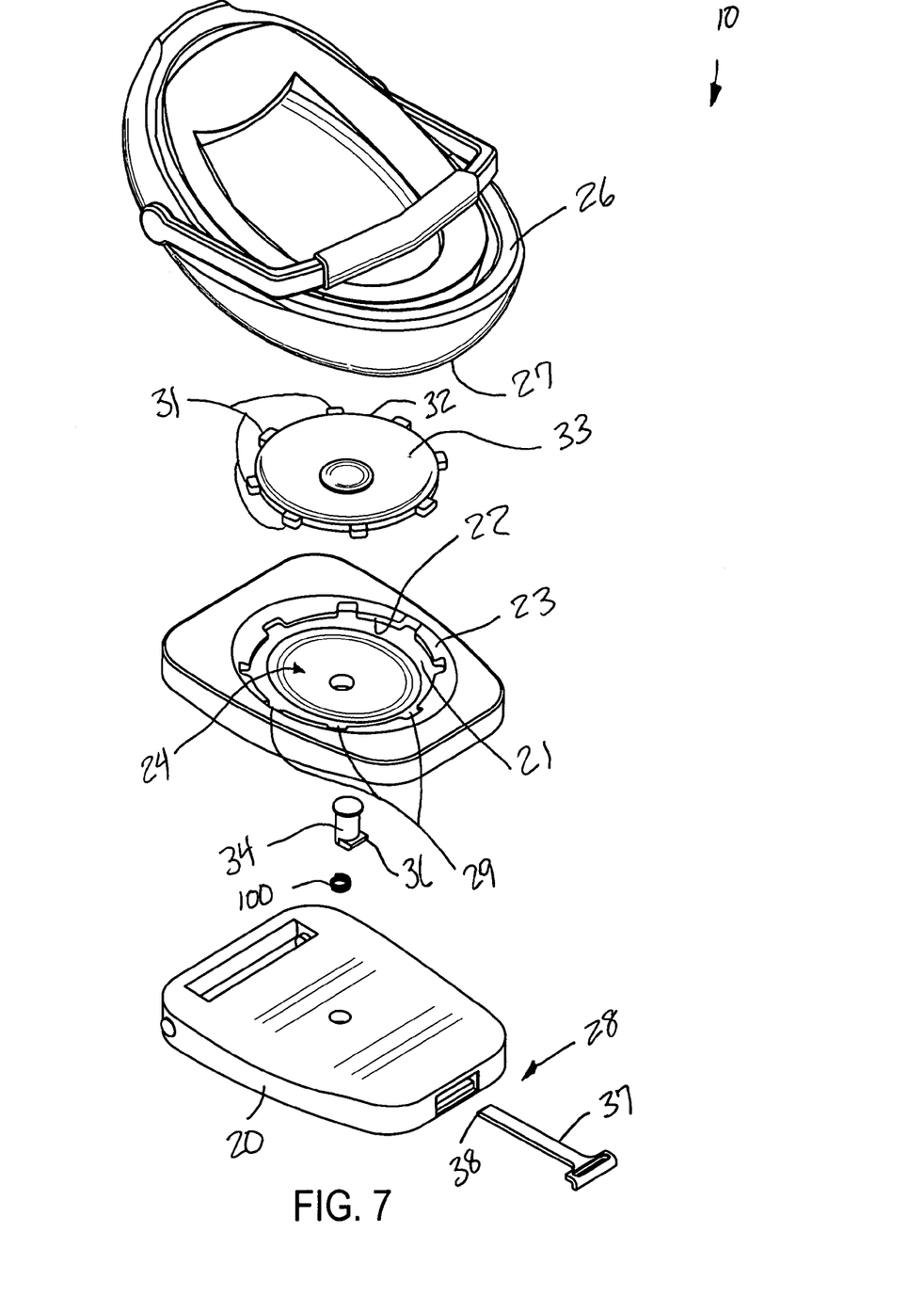
FIG. 7 is an exploded view of the apparatus shown in FIG. 1.
Figure 8:
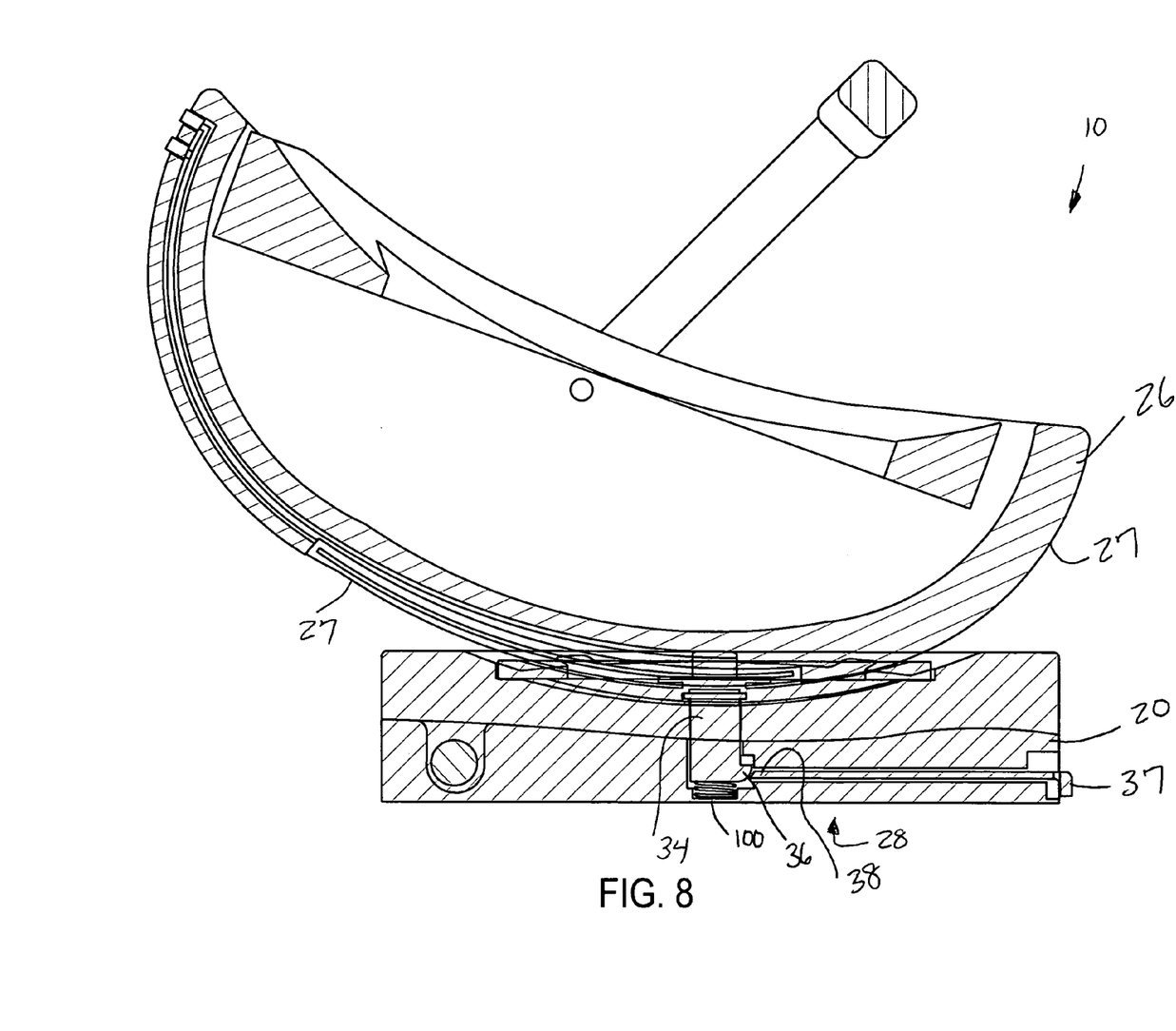
FIG. 8 is a cross sectional view of the apparatus shown in FIG. 1, taken along line 8-8.

Referring to FIGS. 7 and 8, the apparatus 10 further includes a mechanism 28 for lifting and swiveling the seat member 26 above the base member 20 and about a vertically registered fulcrum axis centrally defined within the cavity 24, which is critical such that the bottom ridge 27 is advantageously elevated above the top edge 23 of the walls 22 to thereby allow the seat member 26 to freely rotate along a 360 degree path above the base member 20. The seat member lifting and swiveling mechanism 28 is naturally maintained at a locked position, which is crucial such that the user is required to actively maintain an actuating force traversing the fulcrum axis so that the bottom ridge 27 remains advantageously elevated above the cavity 24 during swiveling procedures. Such a mechanism 28 prevents the seat member 26 from prematurely and undesirably disengaging from the base member 20 during operating conditions.

Referring to FIG. 7, the seat member lifting and rotating mechanism 28 includes a plurality of notches 29 formed within the inner perimeter of the walls 22 and juxtaposed therealong, and a platform 33 statically anchored to a bottom surface of the seat member 26 and centrally abutted against the bottom ridge 27. Such a platform 33 protrudes downwardly from the bottom ridge 27 and has a plurality of ribs 31 radially flanging outwardly from an exterior perimeter 32 of the platform 33, which is vital such that the ribs 31 are slidably intercalated within the notches 29 when the seat member 26 is positioned on the base member 20. The ribs 31 engage the corresponding notches 29 and thereby eliminate movement of the seat member 26 while locked in place within the base member 20.

Referring to FIGS. 7 and 8, a rectilinear shaft 34 is directly connected to the top surface 21 and the bottom surface of the seat member 26 respectively, without the use of intervening elements. Such a shaft 34 is advantageously aligned along the vertical axis wherein the vertical axis is centrally positioned within the walls 22 and oriented perpendicular to the bottom surface. The shaft 34 maintains the seat member 26 in a substantially stable position while the seat member 26 is rotated thereabout during operating conditions. Such notches 29 have open top surfaces, which is necessary for allowing the ribs 31 to vertically disengage therefrom when the shaft 34 is lifted to the elevated position.

Again referring to FIGS. 7 and 8, the seat member lifting and swiveling mechanism 28 further includes a cam member 36 monolithically formed with a bottom most end of the shaft 34 and is provided with an arcuate side facing the distal end of the actuating arm 37. A spring member 100 is anchored to the top surface 21 of the base member 20 and compressible along a vertical direction defined orthogonal to the top surface 21. The cam member 36 is statically coupled to the shaft 34 and seated within the cavity 24. A rectilinear actuating arm 37 horizontally spans into the cavity 24 and confronts the cam member 36, which is important such that a distal end 38 of the actuating arm 37 directly contacts the cam member 36, without the use of intervening elements, during operating conditions. Such a contact allows a user to supply a sufficient force to the actuating arm 37 to thereby cause a corresponding and immediate upward movement of the shaft 37. The spring member 100 is critically positioned beneath the shaft 34 to further supply an upward force and displace the seat member 26 upwardly and away from the walls of the base member 20. The spring member 100 is calibrated to have sufficient strength to lift the seat member 26 and child upwardly and away from the base member. Thus, the spring member 100 is deformably resilient and has opposed ends statically coupled to the bottom most end of the shaft 37 and the top surface 21 of the base member 20.

Yet again referring to FIGS. 7 and 8, such a cam member 36 remains statically affixed to the shaft 34 when the actuating arm 37 is pressed inwardly towards a center of the cavity 24, which is essential to thereby lift the shaft 34 along a vertical path and create an unencumbered horizontal plane between the walls 22 of the base member 20 and the bottom ridge 27 of the seat member 26. The arcuate surface of the cam member 36 glides the actuating arm 37 along a bottom surface thereof and cooperates with the spring member 100 to elevate the seat member 26 while the child is seated therein. The actuating arm 37 is retracted slidably glided along the bottom surface of the cam member 34 when the actuating arm 37 is retracted from the recessed cavity, which is critical such that the shaft 34 advantageously returns to a lowered rested position. The seat member 26 is freely rotatable along the horizontal plane while the shaft 34 is biased at an elevated position, thereby allowing a user to selectively position the seat member 26 in a multitude of positions based on user need and desire. By articulating the cam member 36 as desired, via the articulating arm 37, a user can swivel the seat member 26 as needed during operating conditions.

The apparatus 10 is designed as a cradle style seat for use with individuals up to twenty-two pounds in weight, or as an upright seat for use with individuals weighing between twenty-two and forty pounds. The base member 20 is anchored in place via the vehicle seat belts, or by a conventional latch system. The seat member 26 includes a soft, padded liner that is removable, and secured to the seat member 26 via a plurality of elastic enclosures attached to hooks. The apparatus 10 can feature a three point harness, a three point harness with shield, or a five point harness to restrain the individual during operating conditions. In addition, a handle can be included with the apparatus 10 for facilitating carrying of the seat member 26 when detached from the base member 20.

The lifting and swiveling mechanism 28 allows a user to selectively position the seat member 26 in a multitude of positions based on user desire, and also allows a user to manually rotate the seat member 26 as needed during operating conditions. In addition, the ability of a user to detach the seat member 26 from the base member 20 allows a user to easily transport the seat member 26 without having to remove the entire apparatus 10 from a vehicle, thereby overcoming the previously mentioned prior art shortcomings.

In operation, a method for lifting and swiveling an infant car seat along a 360 degree rotational path includes the steps of providing a base member 20 that has a top surface 21 and a plurality of vertically upstanding walls 22 monolithically formed therewith, vertically stacking a seat member 26 on top of the base member 20, and lifting and swiveling the seat member 26 along a 360 degree path defined above the base member 20 and about a vertically registered fulcrum axis centrally defined within a recessed cavity 24 by elevating the bottom ridge 27 above a top edge 23 of the walls 22 to thereby allow the seat member 26 to freely rotate above the base member 20. The top surface 21 is countersunk below the top edge 23 of the walls 22, which is crucial such that the seat member 26 has a bottom ridge 27 removably disposed within the cavity 24. The seat member lifting and swiveling mechanism 28 is naturally maintained at a locked position, which is necessary such that the user is required to actively maintain an actuating force traversing the fulcrum axis so that the bottom ridge 27 remains elevated above the cavity 24 during swiveling procedures.

The method further includes the steps of pivotally seating a cam member 36 within the cavity 24 by rotatably abutting the cam member 36 against a bottom most end of the shaft 34, horizontally spanning a rectilinear actuating arm 37 into the cavity 24 by confronting the actuating arm 37 against the cam member 36 such that a distal end 38 of the actuating arm 37 directly contacts the cam member 36, without the use of intervening elements, during operating conditions, inwardly pressing the actuating arm 37 into a center of the cavity 24 to thereby glide beneath the cam member 36, lifting the shaft 34 along a vertical path and creating an unencumbered horizontal plane between the walls 22 of the base member 20 and the bottom ridge 27 of the seat member 26, and freely rotating the seat member 26 along the horizontal plane while the shaft 34 is biased at an elevated position.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed is:

1. A portable vehicle child seat for enabling a caregiver to easily access a child in space-restricted vehicle zones, said child seat comprising:

a base member having a top surface and a plurality of vertically upstanding walls monolithically formed therewith, said top surface being countersunk below a top edge of said walls such that a recessed cavity is formed within an inner perimeter of said walls;

a seat member vertically stacked on top of said base member and having a bottom ridge removably disposed within said recessed cavity;

means for lifting and swiveling said seat member above said base member and about a vertically registered fulcrum axis centrally defined within said recessed cavity such that said bottom ridge is elevated above said top edge of said walls to thereby allow said seat member to freely rotate along a 360 degree path above said base member;

wherein said seat member lifting and rotating means comprises a plurality of notches formed within said inner perimeter of said walls and juxtaposed therealong;

a platform statically anchored to a bottom surface of said seat member and centrally abutted against said bottom ridge, said platform protruding downwardly from said bottom ridge and having a plurality of ribs radially flanging outwardly from an exterior perimeter of said platform such that said ribs are slidably intercalated within said notches when said seat member is positioned on said base member; and a rectilinear shaft directly connected to said top surface and said bottom surface of said seat section respectively, said shaft being aligned along the vertical axis wherein the vertical axis is centrally positioned within said walls and oriented perpendicular to said bottom surface;

wherein said seat member lifting and swiveling means further comprises a cam member seated within said recessed cavity and monolithically abutted against a bottom most end of said shaft;

a rectilinear actuating arm horizontally spanning into said recessed cavity and confronting said cam member such that a distal end of said actuating arm directly contacts said cam member during operating conditions; and a deformably resilient spring member having axially opposed ends directly and statically coupled to said shaft and said top surface of said base member respectively, said spring member being releasably compressed along a vertical path when said actuating lever is guided beneath said cam member;

wherein said cam member is upwardly guided when said actuating arm is pressed inwardly towards a center of said recessed cavity to thereby lift said shaft along a vertical path and create an unencumbered horizontal plane between said walls of said base member and said bottom ridge of said seat member, said seat member being freely rotatable along said horizontal plane while said shaft is biased at an elevated position.

2. The child seat of claim 1, wherein said cam member is downwardly guided along a vertical path when said actuating arm is retracted away therefrom so that said shaft returns to a lowered rested position.

3. The child seat of claim 1, wherein said notches have open top surfaces thereby allowing said ribs to vertically disengage therefrom when said shaft is lifted to the elevated position.

4. A portable vehicle child seat for enabling a caregiver to easily access a child in space-restricted vehicle zones, said child seat comprising:

a base member having a top surface and a plurality of vertically upstanding walls monolithically formed therewith, said top surface being countersunk below a top edge of said walls such that a recessed cavity is formed within an inner perimeter of said walls;

a seat member vertically stacked on top of said base member and having a bottom ridge removably disposed within said recessed cavity;

means for lifting and swiveling said seat member above said base member and about a vertically registered fulcrum axis centrally defined within said recessed cavity such that said bottom ridge is elevated above said top edge of said walls to thereby allow said seat member to freely rotate along a 360 degree path above said base member, said seat member lifting and swiveling means being naturally maintained at a locked position such that the user is required to actively maintain an actuating force traversing the fulcrum axis so that said bottom ridge remains elevated above said recessed cavity during swiveling procedures;

wherein said seat member lifting and rotating means comprises a plurality of notches formed within said inner perimeter of said walls and juxtaposed therealong;

a platform statically anchored to a bottom surface of said seat member and centrally abutted against said bottom ridge, said platform protruding downwardly from said bottom ridge and having a plurality of ribs radially flanging outwardly from an exterior perimeter of said platform such that said ribs are slidably intercalated within said notches when said seat member is positioned on said base member; and a rectilinear shaft directly connected to said top surface and said bottom surface of said seat section respectively, said shaft being aligned along the vertical axis wherein the vertical axis is centrally positioned within said walls and oriented perpendicular to said bottom surface;

wherein said seat member lifting and swiveling means further comprises a cam member seated within said recessed cavity and monolithically abutted against a bottom most end of said shaft;

a rectilinear actuating arm horizontally spanning into said recessed cavity and confronting said cam member such that a distal end of said actuating arm directly contacts said cam member during operating conditions; and a deformably resilient spring member having axially opposed ends directly and statically coupled to said shaft and said top surface of said base member respectively, said spring member being releasably compressed along a vertical path when said actuating lever is guided beneath said cam member;

wherein said cam member is upwardly displaced along a vertical and linear direction when said actuating arm is pressed inwardly towards a center of said recessed cavity to thereby lift said shaft along a vertical path and create an unencumbered horizontal plane between said walls of said base member and said bottom ridge of said seat member, said seat member being freely rotatable along said horizontal plane while said shaft is biased at an elevated position.

5. The child seat of claim 4, wherein said cam member is downwardly displaced along a vertical and linear direction when said actuating arm is retracted away therefrom so that said shaft returns to a lowered rested position.

6. The child seat of claim 4, wherein said notches have open top surfaces thereby allowing said ribs to vertically disengage therefrom when said shaft is lifted to the elevated position.

* * * * *